United States Patent [19]
Buerger

[11] 3,881,778
[45] May 6, 1975

[54] WHEEL TRIM LOCKING RINGS
[75] Inventor: Herbert Buerger, Walton, N.Y.
[73] Assignee: Del-Met Corporation, Walton, N.Y.
[22] Filed: Sept. 13, 1973
[21] Appl. No.: 396,708

[52] U.S. Cl. .............................. 301/37 B; 301/37 R
[51] Int. Cl. ............................................. B60b 7/06
[58] Field of Search ........................ 301/37 R, 37 B

[56] References Cited
UNITED STATES PATENTS

| | | | |
|---|---|---|---|
| 2,624,628 | 1/1953 | Lyon | 301/37 B |
| 2,809,076 | 10/1957 | Plotkin | 301/37 R |
| 3,521,933 | 7/1970 | Buerger | 301/37 R |
| 3,757,401 | 9/1973 | Beisch | 301/37 B |

Primary Examiner—M. Henson Wood, Jr.
Assistant Examiner—Reinhard J. Eisenzopf
Attorney, Agent, or Firm—J. B. Felshin; Marvin Feldman

[57] ABSTRACT

This locking ring has alternating long and short spring fingers formed with radially outwardly and axially outwardly inclined, bent back lips. The fingers each have axially inwardly converging side edges. These fingers are also each formed with radially inwardly transversely curved converging ribs parallel to said converging side edges for stiffening the fingers in an axial direction. These fingers also each have a radially outwardly peripherally extending rib between each pair of converging ribs. The spring fingers of the locking ring are inclined axially and radially inwardly while the bent back lips are inclined radially and axially outwardly.

2 Claims, 7 Drawing Figures

WHEEL TRIM LOCKING RINGS

This invention relates to vehicle wheel trim locking rings. These locking rings are permanently attached to wheel trims such as rings or wheel covers and can be engaged with the tire rims of vehicle wheels by moving the trims axially inwardly for engagement of the bent back lips of the spring fingers with the undersurface of the tire engaging rims of the wheels. In U.S. Pat. No. 3,521,933 granted July 28, 1970 to applicant herein, such a locking ring is disclosed. Said patent discloses alternating longer and shorter spring fingers all around the locking ring. One difficulty with such construction has been that the spring fingers lack stiffening in transverse directions. Also the spring fingers of said patent did not have sufficient inclination. It is hence an object of this invention to obviate the difficulties found with said patented construction.

A further object of this invention is to provide a locking ring of the character described provided with converging strengthening ribs in both the long and short spring fingers.

Another object of this invention is to provide a locking ring of the character described in which each finger is provided with a peripherally extending rib between the pair of converging ribs so that each finger is reinforced in both transverse and peripheral directions.

Yet a further object of this invention is to provide a locking ring of the character described in which the alternating longer and shorter spring fingers are inclined radially and axially inwardly while the bent back lips of said fingers are inclined radially and axially outwardly.

Still a further object of this invention is to provide a locking ring of the character described, in which the bent back lips of the longer spring fingers extend radially outwardly to a somewhat greater diametric extent, but are inclined to a plane normal to the axis of the locking ring to a lesser angle than the bent back lips of the shorter fingers.

Yet another object of this invention is to provide a locking ring of the character described in which the alternating longer and shorter spring fingers have axially inwardly converging side edges and the strengthening ribs are disposed parallel to said side edges and in which said ribs extend radially inwardly of said locking ring and are transversely curved.

Still another object of this invention is to provide a strong, rugged and durable locking ring of the character described, which shall be easy to apply to a vehicle wheel, which shall be relatively inexpensive to manufacture and yet practical and efficient to a high degree in use.

Other objects of this invention will in part be obvious and in part hereinafter pointed out.

The invention accordingly consists in the features of construction, combinations ob elements, and arrangement of parts which will be exemplified in the construction hereinafter described and of which the scope of invention will be indicated in the following claims.

Figure 1:
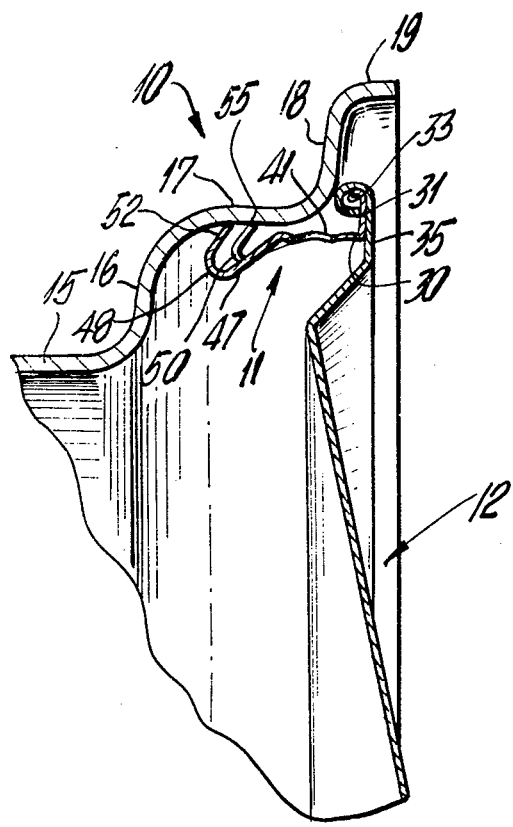
FIG. 1 is a partial cross-sectional view of a vehicle wheel with a locking ring embodying the invention shown in cross section on line 1—1 of FIG. 2.
Figure 2:
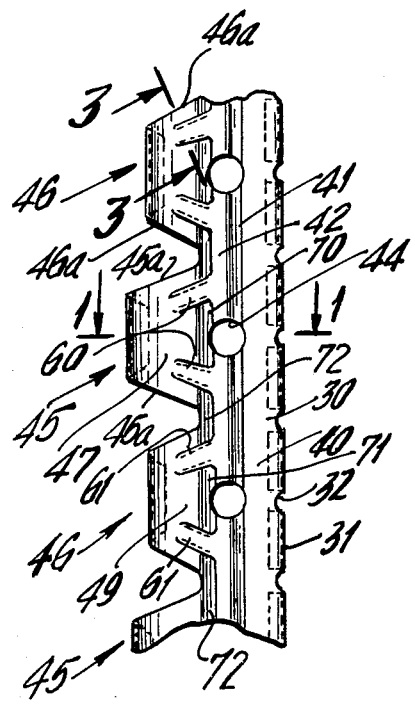
FIG. 2 is a partial inner view of such locking ring looking radially outwardly from inside the ring.
Figure 4:
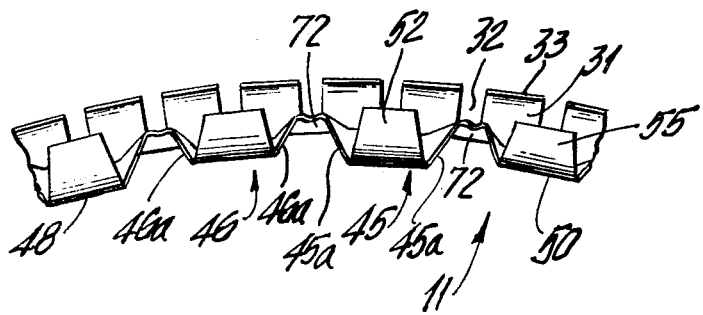
FIG. 4 is a partial side elevational view of the grip ring alone looking axially outwardly at FIG. 1.
Figure 3:
FIG. 3 is a partial cross-sectional view taken on line 3—3 of FIG. 2.

Referring now in detail to the drawing, numeral 10 designates a portion of the tire carrying rim of a conventional vehicle wheel, 11 designates a locking ring embodying the invention attached to said rim, and 11 designates a wheel trim, here shown in the form of a wheel cover attached to the locking ring. The vehicle tire rim 10 may be of conventional construction, and comprises an annular web 15 from the outer side of which there extends radially outwardly an annular flange 16. Extending axially outwardly from flange 16 is an axial annular flange 17.

Extending radially outwardly from flange 17 is an annular flange 18 provided with an axially outwardly extending annular lip 19. The vehicle tire (not shown) may be mounted on flange 17 in conventional manner.

The locking ring 11 is made of spring metal. It comprises an annular portion 30 from which there extends outwardly, a plurality of axial similar fingers 31 separated by radial slots 32, all around the ring. Extending axially inwardly from each finger 31 is a short lip 33. The cover 11 has a circular flange 35 in a plane perpendicular to the axis of the ring, lying flat against the outside of the fingers 31. Extending from the outer periphery of the flange 35 is a rolled bead 36 rolled about the lips 33 and against the inner surfaces of said fingers 31 for fixing the cover to the locking ring. The wheel cover can otherwise be of any suitable shape. It can be substituted by an annular wheel ring that grips the outer ends of fingers 31 and the lips 33.

Coming back to the locking ring 11, annular portion 30 may be inclined about 5° to the axis of the locking ring in a direction radially inwardly and axially outwardly of the ring. Extending from said annular portion 30 is an annular portion 40 inclined transversely radially and axially inwardly. Extending from annular portion 40 is an annular portion 41 which in a transverse direction is inclined radially outwardly and axially inwardly. Extending from portion 41 is an annular portion 42 inclined in a transverse direction radially and axially inwardly. Portions 41, 42 are intercepted by equally spaced holes 44, there being one hole aligned with every other slot 32.

At the apex between each pair of adjacent converging side edges 45a, 46a, is a radially, outwardly, axially inwardly extending portion 72, as shown in the drawing, to further stiffen said locking ring. Portion 41 is on one side of portion 42, and ribs 70, 71 and portions 72 are on the opposite side of portion 42. Portions 72 are partially peripherally aligned with ribs 70, 71 as illustrated.

The locking ring 11 is also formed with alternating longer and shorter spring fingers 45, 46, respectively, all around the ring. The spring fingers are centered with respect to the holes 44. Fingers 45 have axially inwardly converging side edges 45a. Fingers 46 have axially inwardly converging side edges 46a. The spring fingers 45 each have a portion 47 which in a transverse direction is inclined axially and radially inwardly from 30° to 40° to a plane normal to the axis of the ring, but preferably about 35°.

Extending from finger portion 47 is a bent back curved portion 48 of 0.075 inch to 0.110 inch radius, but preferably about 0.093 inch radius.

The shorter fingers 46 each have a portion 49 inclined similarly to portions 47 of fingers 45. Extending from finger portions 49 are curved bent back portions 50 having a radius of 0.060 inch to 0.090 inch, preferably about 0.078 inch in radius.

Extending from bent back curved portion 48 is a lip 52 inclined radially and axially outwardly at an angle of about 35° to a plane normal to the axis of the ring.

Extending from the bent back curved portion 50 of the smaller finger is a lip 55 inclined radially and axially outwardly at about 40° to a plane normal to the axis of the ring. The lips 52 of the longer fingers extend radially outwardly somewhat further than the lips 55 of the shorter fingers.

Portions 47 of fingers 45 are each formed with inclined divergent radially inwardly depressed ribs 60 parallel to divergent side edges 45a. Portions 49 of shorter fingers 46 are formed with similar depressed ribs 61 parallel to diverging edges 46a. Said ribs 60, 61 terminate short of the curved portions 48, 50.

At the base of each longer finger portion 47 is an upwardly pressed peripherally extending rib 70 disposed between the radially inwardly pressed ribs 60.

Each shorter finger portion 49 has a radially outwardly pressed rib 71 disposed between the radially inwardly pressed ribs 61. Ribs 71 extend peripherally.

As the locking ring with its wheel trim attached thereto is moved axially inwardly of the wheel rim 10 for attaching the trim to the wheel, the outer end edges of the lips 52 of the longer fingers 45 first engage the inner or undersurface of the rim 10 and center the locking ring and the trim relative to the rim 10. Then the ring and trim may be pushed all the way in to the left locking at FIG. 1, to fully attach said ring and trim to the wheel.

The ribs 60, 61 and also the ribs 70, 71 strengthen and rigidify the fingers for better engagement.

The inclination of the spring fingers and lips serve to add flexibility at the lips for easier mounting.

The holes 44 extend into the portions 70, 71 of the ring.

The portions 30, 40, 41, 42, 70 and 71 of the locking ring constitute an annular flange from which the spring fingers 45, 46 extend.

The ring may be die stamped flat with similar end portions that can be overlapped and attached together upon bending the flat strip into ring shape in the well known manner.

Figure 5:
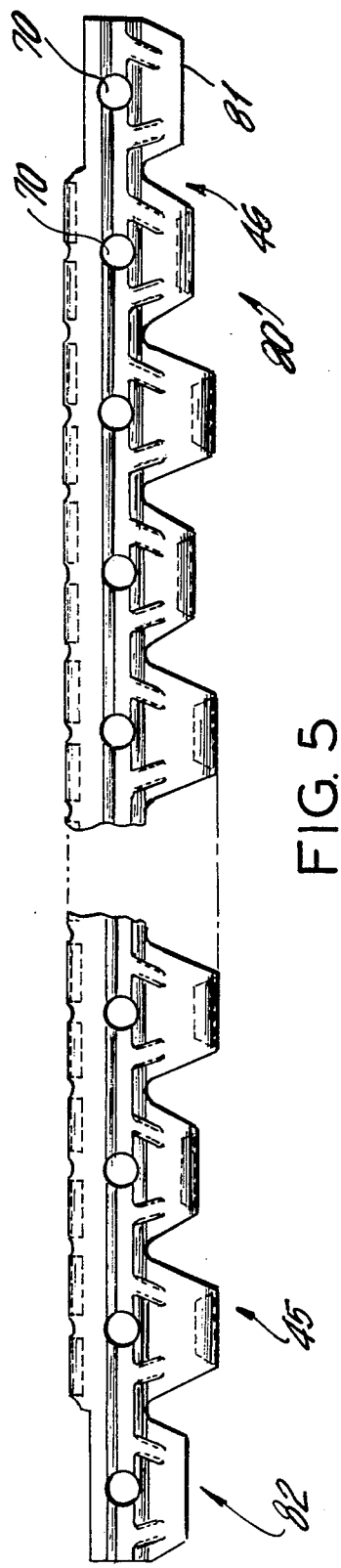
FIG. 5 is a bottom plan view of the strip from which the grip ring is made, with a central part of the strip broken away.
Figure 7:
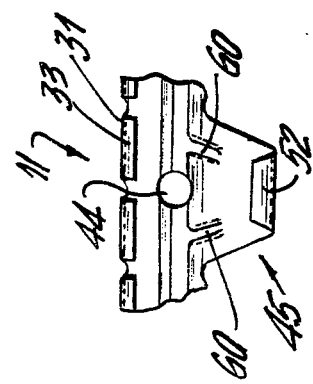
FIG. 7 is a partial view of the grip ring looking radially inwardly and showing only one of the spring fingers.
Figure 6:
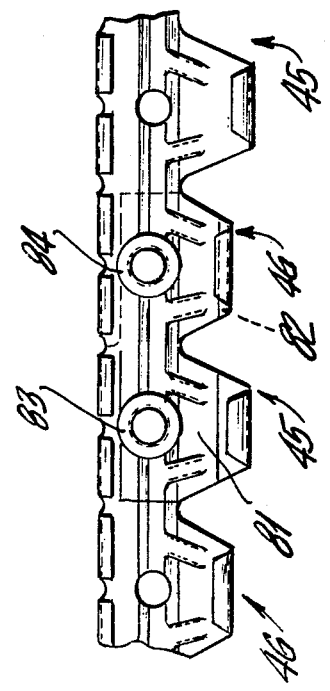
FIG. 6 is a view looking radially inwardly at the overlaping attached together ends of the strip of FIG. 5 and adjacent portions.

In FIG. 5 there is shown a straight strip 80 from which one grip ring 11 is made. This strip has at its outer ends, portions 81, 82 which are the length of one spring finger each. The portion 81 is next to a short spring finger 46. The portion 82 is next to a long spring finger 45. The portions 81, 82 omit the portions 31, 33 and the bent back lips. This strip is bent into circular shape, so that the portion 81 at one end overlaps the longer spring finger 45 next adjacent the other end 82, while the portion 82 underlaps the shorter spring finger next adjacent the other end portion 81. The portion 81 is riveted to the longer spring finger 45 it overlaps by a grommet 83 while the end portion 82 is riveted to shorter spring finger 46 it underlaps by a grommet 84.

The advantage of the ribs 60, 61 is that they increase the spring rate or amount of flexibility and return of the fingers to normal after flexing and release. These stiffening ribs decrease the time it takes to return the flexed fingers to normal, after flexing.

The wheels go out of round under the weight of the car and hence the peripheral locations of greatest flexing travels around the locking ring. These stiffeners make the spring fingers more capable of returning to a pre-position of least flexing.

The middle, peripheral ribs 70, 71 between the ribs 60, 61, respectively, increases the radial height from the troughs of the converging transverse ribs 60, 61, to the crests of the peripheral ribs, 70, 71, and hence increases the strength of the transverse ribs.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. A locking ring comprising an annular flange, spring fingers extending from one side of the annular flange, said fingers each having a pair of transversely extending ribs, said fingers having bent back lips at their outer ends, flange means extending radially outwardly from the other side of said annular flange, and a wheel trim attached to said flange means, said spring fingers each having axially inwardly convergent side edges and said ribs of each finger converging axially inwardly, and said ribs of each finger being parallel to the side edges of said finger, said converging ribs being radially inwardly depressed, each finger having a peripheral rib between said pair of converging ribs, said peripheral ribs extending radially outwardly.

2. The combination of claim 1, the apex portions of said locking ring between the convergent side edges of adjacent fingers, extending radially outwardly.

* * * * *